Feb. 25, 1958 J. R. ROEHRIG 2,824,487
APPARATUS FOR GRADING ANISOTROPIC FIBERS
Filed Aug. 25, 1954
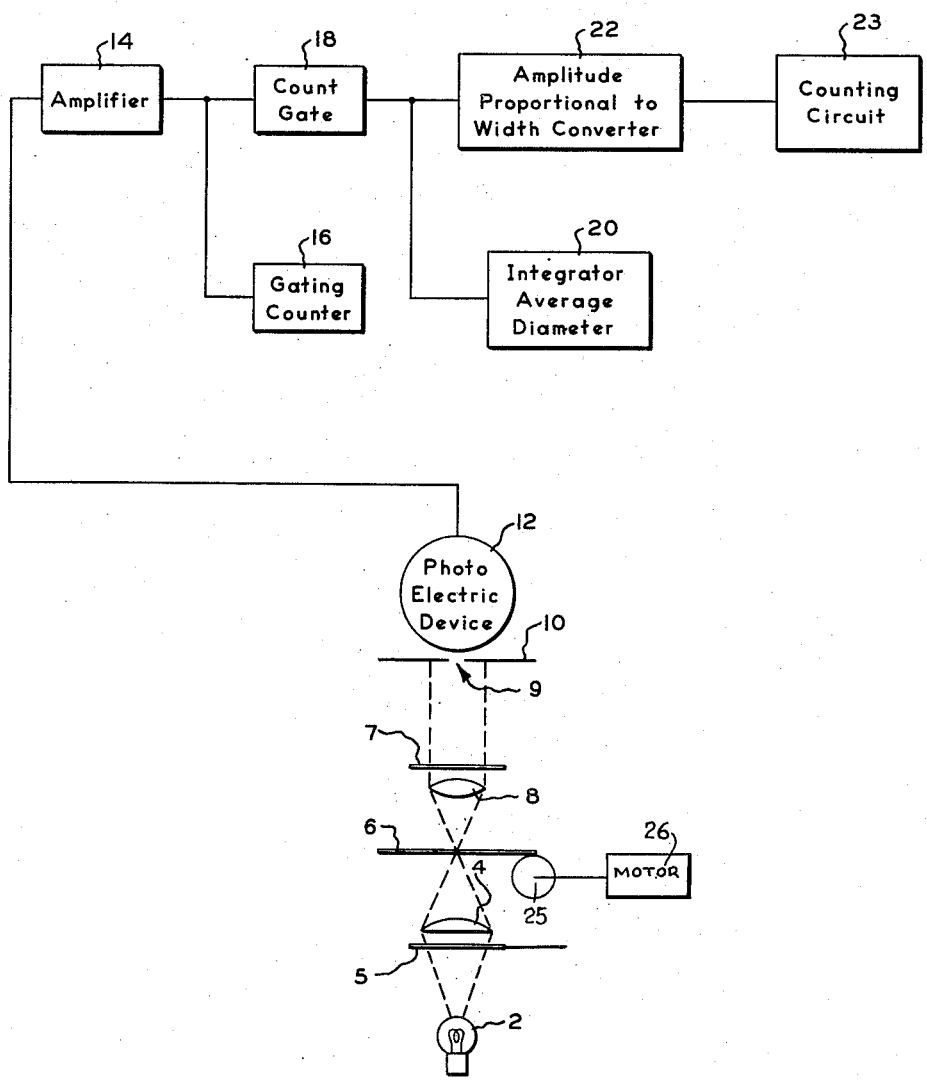
INVENTOR.
Jonathan R. Roehrig
BY
Oliver W. Hayes
ATTORNEY United States Patent Office 2,824,487
Patented Feb. 25, 1958

2,824,487

APPARATUS FOR GRADING ANISOTROPIC FIBERS

Jonathan R. Roehrig, South Sudbury, Mass., assignor to National Research Corporation, Cambridge, Mass., a corporation of Massachusetts Application August 25, 1954, Serial No. 452,015

4 Claims. (Cl. 88—14)

This invention relates to measuring and in particular to the measuring of fibers.

A principal object of this invention is to provide an improved apparatus for readily and accurately measuring the average diameter and diameter distribution of fibers.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawing which is a diagrammatic illustration of one preferred embodiment of the present invention.

Throughout the various textile industries, stringent standards have been established so as to result in a uniform basis upon which fibers may be graded or classified. The measurements of the average diameter and diameter distribution of fibers are often the most important characteristics in determining the grade or fineness of fibers on which the ultimate price and end use of the fibers largely depend. In the copending application of Lawrance et al., Serial No. 399,011, filed December 18, 1953, there is described an apparatus which has been found successful in measuring the average diameter and diameter distribution of fibers.

As described in the aforementioned copending application, it has been shown that the desired fiber measurements can be obtained by optically scanning groups of short sectioned fibers which have been aligned in a substantially parallel manner in the focal plane of a suitable optical scanning system. This optical scanning system preferably comprises a source of light, a lens system for forming a beam of light, a transparent support for holding the fibers to be scanned, and a photoelectric device responsive to changes in illumination. A group of fibers can be aligned by placing the fibers on a suitable grating and then picking these fibers from the grating by means of pressure-sensitive adhesive tape which will maintain the fiber alignment. The pressure-sensitive adhesive tape can then be secured to a microscope slide and passed through the optical system. The image of the fibers moving at a constant rate in a direction transverse of the fiber length is projected on the photoelectric device so as to produce electrical signals or pulses which bear a direct relationship to the diameter of the fibers scanned. These electrical signals containing width information are then fed to suitable counting circuits.

In order to obtain accurate measurements by the above techniques, it is necessary to prepare the fiber sample with the utmost care since there are several conditions which can arise to interfere with the accuracy of the measurements. For example, the presence of minute air bubbles or particles of dust on the transparent support upon which the fibers are aligned may cause a change of illumination on the photoelectric device and thus produce an erroneous electrical signal. Likewise, when air bubbles or particles of dust are located adjacent to a fiber, then the width of the electrical signal produced may be greater than the actual width of the fiber.

The present invention is directed to the elimination of such difficulties so as to permit less stringent care in the preparation of the fiber samples. It has been found that these particular difficulties can be eliminated, for many fibers, by including in the optical system a pair of substantially linear polarizing filters whose planes of polarization are at a substantial angle to each other. These filters are preferably placed on opposite sides of a transparent fiber support and a beam of light is polarized on passing through the filter located before the support. Many important textile fibers exhibit significant optical anisotropy such that, for example, a plane polarized light beam incident on the fiber in a direction other than parallel to the longitudinal axis of the fiber and having its plane of polarization at an angle other than 0° or 90° with respect to the longitudinal axis of the fiber will be converted to elliptically polarized light by passing through the fiber. The polarized light passing through the fibers (aligned in a substantially parallel relationship) is thus appreciably elliptically polarized by those fibers which are optically anisotropic. The polarizing filter located after the support preferably has its plane of polarization at 90° with respect to the first filter and consequently transmits only that light which has been elliptically polarized by passing through the optically anisotropic fibers. Thus the only light reaching the photoelectric device is that which is obtained from a type of fiber having optical anisotropy. Accordingly, the fiber must be capable of elliptically polarizing the light to a sufficient degree so that a useful portion of the light is thereafter capable of passing through the second polarizing filter. With the preferred arrangement, the projected image consists of a dark background on which the images of the individual optically anisotropic fibers stand out as bright areas.

It can, therefore, be seen that the preferred embodiment of the invention which employs crossed linear polarizing filters serves several important functions. First, it prevents any variation in the illumination caused, for example, by the presence of air bubbles, from reaching the photoelectric device since these bubbles are not capable of elliptically polarizing the plane polarized light. It also eliminates any possibility of counting dust specks since such specks are usually either opaque or optically istoropic and will not be distinguishable from the dark background.

Referring now to the drawing, there is shown one preferred embodiment of the invention. A suitable source of light 2 is provided for the optical scanning system. The light from this source is polarized by means of a linear polarizing filter 5 and then concentrated into a beam by means of lens 4 which is of the converging or condensing type. It is also permissible to form the beam of light first before passing it through the polarizing means. The polarized light then falls upon the transparent support 6 which is held in the focal plane of the optical system and upon which is positioned a number of fibers aligned in a substantially parallel relationship. The fibers are aligned at an appreciable angle (preferably 45°) with respect to the plane of polarization of linear polarizing filter 5. The polarized light passing from the polarizing filter 5 passes through the transparent support 6 holding the aligned fibers thereon, said transparent support being moved by means of a gear or wheel 25 and a constant speed motor 26. Each optically anisotropic fiber on transparent support 6 elliptically modifies the plane polarized light. As explained previously, this elliptical modification of the polarized light is preferably such that the light which has passed through the optically anisotropic fiber is transmitted through the linear polarizing filter 7. The light from each such fiber passes through lens 8 and linear polarizing filter 7 and is then directed through the small slot or slit 9 in the shield 10 which limits the quantity of light admitted to the photoelectric device 12. The width of the slit 9 in the shield 10 is preferably considerably less than the projected diameter of the smallest fiber to be measured since the accuracy of the measurements depends, to a large extent, upon the width of slit 9. Thus, the smaller the slit 9, the more accurate the measurements will be. Slit 9 is also preferably shorter than the fibers and preferably narrower than one-tenth of the smallest projected fiber diameter so as to provide accurate diameter measurements.

At 12 there is indicated a photoelectric device. This may be any one of the well-known photoelectric cells whose electrical properties are changed when the illumination thereof is varied. Thus, when there is a change in the quantity of light passing through the slit 9 and striking the photoelectric device 12, there is produced an electrical signal. In the present case, the variation of illumination on the photoelectrical device 12 is produced by moving the transparent support 6 with the parallel aligned fibers thereon at a constant rate in a direction which is preferably normal to the fiber length. When the transparent support is thus moved at a constant rate by a means such as a synchronous motor, each fiber image passes successively by the slit 9. Since the image of the fiber length is arranged substantially parallel to the length of slit 9 and since the fibers are aligned in a substantially parallel relationship, the variation of the illumination caused by the passage of a fiber image on the photoelectric device 12 produces a sharp electrical signal with the passage of the image of a fiber edge. The width of the electrical signal thus formed, or the time interval between the paired signals corresponding to the two edges of the fiber, is thus directly proportional to the diameter of the scanned fiber image.

The width-modulated electrical signals are preferably transmitted to a suitable amplifier 14 wherein they are amplified. In order to ascertain the number of fibers scanned and measured, a gating counter 16 is preferably connected into the circuit. The gating counter 16 may consist of any of the well-known counter circuits employed in the electronic industry. So that no more than the requisite number of fibers is measured, the gating counter 16, when it has reached the number to which it is set, actuates a count gate 18 which prevents any subsequent incoming width-modulated electrical signals from proceeding any further.

The measurement of the average fiber diameter is provided by interposing an averaging device such as an integrator 20 into the circuit at a suitable location, preferably immediately following the count gate 18. This is preferably a circuit in which electrical signals of uniform amplitude but of duration proportional to fiber width are fed to an electrical capacitor and the resultant voltage measured by a high-input impedance vacuum tube voltmeter. For a predetermined number of fibers, as is obtained with the preferred embodiment containing a gating counter 16 and a count gate 18, this type of circuit will give a convenient and direct reading of the average width.

In a preferred embodiment of the invention, the diameter distribution of the fibers is obtained by changing the form of the electrical signals from width modulation to amplitude modulation. The thus modified signal is then fed to a counting circuit generally indicated at 23 which preferably includes a number of amplitude selector circuits which actuate a number of associated counter circuits and anti-coincidence circuits, as more fully described and claimed in the aforementioned copending application of Lawrance et al.

Numerous embodiments of the invention may be employed without departing from the scope thereof. For example, the optical system may be so arranged that the two linear polarizers are in substantial alignment, in which case the optically anisotropic fiber will show up as a darkened area on a light background. This has the advantage of greatly increasing the contrast of the relatively transparent fiber so that air bubbles and the like can be distinguished during measurement. However, it does not distinguish from dust particles and requires more accurate adjustment of the photoelectric cell than the previously described system which employs crossed linear polarizers to provide a black background and bright fiber images. The polarizers can, if desired, be elliptical or circular instead of being linear. In this case, the anisotropic fiber will further modify the elliptically polarized light so that the thus modified light can be distinguished by a suitable analyzer.

Since certain changes may be made in the above apparatus without departing from the scope of the invention herein involved, it is intended that all matter contained in the above description, or shown in the accompanying drawing, shall be interpreted as illustrative and not in a limiting sense.

What is claimed is:

1. An apparatus for grading optically anisotropic fibers comprising a pair of substantially linear polarizers, the linear polarizers having their planes of polarization at a definite large angle with respect to each other, means interposed between said polarizers for holding a number of fibers in substantially parallel relationship and in the focal plane of an optical system so that the axes of the fibers bear a predetermined relationship to the planes of polarization of the linear polarizers, means for creating relative movement between said holding means and a polarized light beam passing between the filters, the relative movement being at a constant rate and transverse of the fiber length so as to modify the polarized light beam as a function of the fiber diameters, light responsive means for converting said modified polarized light beam into an electrical signal, and means limiting the amount of light reaching the light responsive means at a given instant of time to that light passing through an individual fiber so that the signal varies as a function of the fiber diameters.

2. An apparatus for grading optically anisotropic textile fibers comprising a pair of substantially linear polarizing filters, the filters having their planes of polarization at a definite large angle with respect to each other, means interposed between said filters for holding a number of fibers in substantially parallel relationship and in the focal plane of an optical system including said filters so that the axes of the fibers bear a predetermined relationship to the planes of polarization of the filters, means for moving said holding means at a constant rate to create a constant relative movement between said fibers and a light source, said movement being transverse of the fiber length so as to modify a polarized light beam passing between the filters as a function of the fiber diameters, and means for converting said modified polarized light beam into an electrical signal varying as a function of the fiber diameters.

3. An apparatus for grading optically anisotropic fibers comprising a first polarizing filter, a second polarizing filter, the second polarizing filter being substantially opaque to light passed by the first polarizing filter, means interposed between said filters for holding a number of fibers in substantially parallel relationship and in the focal plane of an optical system including said filters so that the axes of the fibers are at about 45° with respect to the plane of polarization of the first filter, and means for creating a constant relative movement between said fibers and a light source, said movement being transverse of the fiber length so as to modify the light beam passing between the filters.

4. An apparatus for grading optically anisotropic textile fibers comprising a pair of substantially linear polarizing filters, the filters having their planes of polarization at about 90° with respect to each other, means interposed between said filters for holding a number of fibers in substantially parallel relationship and in the focal plane of an optical system including said filters so that the axes of the fibers are at about 45° with respect to the planes of polarization of the filters, means for creating a constant relative movement between said fibers and a light source, said movement being transverse of the fiber length so as to modify the light beam passing between the filters as a function of the fiber diameters, and means for converting said modified polarized light beam into an electrical signal varying as a function of the fiber diameters.

References Cited in the file of this patent

UNITED STATES PATENTS

| | | |
|---|---|---|
| 1,915,204 | Scheibli et al. | June 20, 1933 |
| 2,037,044 | Reinartz et al. | Apr. 14, 1936 |
| 2,509,068 | McMahon | May 23, 1950 |
| 2,648,251 | Puster | Aug. 11, 1953 |